United States Patent
Wang et al.

(10) Patent No.: US 11,444,526 B2
(45) Date of Patent: Sep. 13, 2022

(54) SYSTEMS AND METHODS FOR REDUCING PHYSICAL SIZE OF POWER CONVERTER WITH ACTIVE FILTER

(71) Applicant: THERMO KING CORPORATION, Minneapolis, MN (US)

(72) Inventors: Xiaorui Wang, Edina, MN (US); Ryan Wayne Schumacher, Bloomington, MN (US)

(73) Assignee: Thermo King Corporation, Minneapolis, MN (US)

(*) Notice: Subject to any disclaimer, the term of this patent is extended or adjusted under 35 U.S.C. 154(b) by 0 days.

(21) Appl. No.: 17/103,149

(22) Filed: Nov. 24, 2020

(65) Prior Publication Data
US 2022/0166304 A1    May 26, 2022

(51) Int. Cl.
*H02M 1/08*  (2006.01)
*H02M 7/48*  (2007.01)
*H02M 7/217*  (2006.01)
*B60H 1/32*  (2006.01)

(52) U.S. Cl.
CPC ............ *H02M 1/08* (2013.01); *H02M 7/217* (2013.01); *H02M 7/48* (2013.01); *B60H 1/3226* (2013.01); *B60H 2001/3292* (2013.01)

(58) Field of Classification Search
CPC .......... H02M 1/00; H02M 1/08; H02M 7/217; H02M 7/48
See application file for complete search history.

(56) References Cited

U.S. PATENT DOCUMENTS 6,804,127 B2 * 10/2004 Zhou ................... H02M 5/458
                                                           363/37
8,570,774 B2  10/2013 Wang et al.
9,071,141 B2   6/2015 Dong et al.
(Continued)

FOREIGN PATENT DOCUMENTS

JP      08216657     8/1996
JP      2017208940   11/2017
WO      2020069107   4/2020

OTHER PUBLICATIONS

Wang et al., "A High Power Density Single-Phase PWM Rectifier With Active Ripple Energy Storage", IEEE Transactions on Power Electronics, vol. 26, No. 5, May 2011, pp. 1430-1443.
(Continued)

*Primary Examiner* — Hai L Nguyen
(74) *Attorney, Agent, or Firm* — Hamre, Schumann, Mueller & Larson, P.C.

(57) ABSTRACT

Methods and systems for controlling a multipurpose power converter for converting power for a transport climate control system are provided. The multipurpose power converter includes a rectifier having a first leg, a second leg, and a third leg. The multipurpose power converter also includes a first switch, a second switch, and an inductor-capacitor network. The first switch and the second switch are connected to the third leg. The inductor-capacitor network is connected to the first switch. When the first switch is on and the second switch is off, the multipurpose power converter is configured as a single-phase AC power converter. When the first switch is off and the second switch is on, the multipurpose power converter is configured as a three-phase AC power converter.

20 Claims, 7 Drawing Sheets

(56) References Cited

U.S. PATENT DOCUMENTS

| | | |
|---|---|---|
| 9,246,398 B2 * | 1/2016 | Sakakibara ....... H02M 7/53875 |
| 11,114,882 B2 * | 9/2021 | Muratsu .............. H02M 5/4585 |
| 2012/0112528 A1 | 5/2012 | Fassnacht |
| 2012/0257429 A1 | 10/2012 | Dong et al. |

OTHER PUBLICATIONS

Extended European Search Report, issued in the corresponding European patent application No. 21208829.8, dated Apr. 8, 2022, 8 pages.

* cited by examiner

SYSTEMS AND METHODS FOR REDUCING PHYSICAL SIZE OF POWER CONVERTER WITH ACTIVE FILTER

FIELD

This disclosure relates generally to converting power for a transport climate control system. More specifically, the disclosure relates to methods and systems for controlling a multipurpose power converter for converting power for a transport climate control system.

BACKGROUND

A transport climate control system can include, for example, a transport refrigeration system (TRS) and/or a heating, ventilation and air conditioning (HVAC) system. A TRS is generally used to control an environmental condition (e.g., temperature, humidity, air quality, and the like) within a cargo space of a transport unit (e.g., a truck, a container (such as a container on a flat car, an intermodal container, etc.), a box car, a semi-tractor, a bus, or other similar transport unit). The TRS can maintain environmental condition(s) of the cargo space to maintain cargo (e.g., produce, frozen foods, pharmaceuticals, etc.). In some embodiments, the transport unit can include a HVAC system to control a climate within a passenger space of the vehicle.

SUMMARY

Regulations to reduce emissions (e.g., particulate matter emissions, nitrogen oxide emissions, noise emissions, etc.), for example, from a vehicle prime mover (e.g., a combustion engine such as a diesel engine, etc.), have led to components within the vehicle being electrically driven. As such, utility power (or shore power or grid power) is used more often to charge and/or power the electrified components. When interfacing with electrical power supply such as the utility power, there are interface requirements which require filtering that may have very large volume.

The utility power may be single-phase alternating current (AC) power (e.g., in North America) or three-phase AC power (e.g., in Europe). The utility power may be converted into direct current (DC) power via a power converter to supply power to the electrified components of the transport climate control system. In order to provide a stable DC-link in the power converter with low ripple power under the single-phase and/or three-phase AC power, a DC-link capacitor with a large physical size (e.g., a physical size of a capacitor corresponding to at or about 2.3 millifarad or higher capacitance) may be desired. It will be appreciated that the harmonics and ripple from a single phase power conversion can be greater than a three-phase power conversion, and single phase rectification can have more ripple than three-phase rectification. As such, filtering needs may be more stringent and bigger components may be needed with a single phase power input than with a three-phase power input. Because of the increased ripple of the single phase power conversion, the power converter circuit design can require larger filter components such as capacitors. The capacitors may be much larger in physical size (e.g., a physical size of a capacitor corresponding to at or about 2.3 millifarad or higher capacitance) than the additional switches (described later in FIGS. 3A and 3B as 302 and 304) used in the embodiments disclosed herein. Single phase power conversion can lead to more ripple as twice fundamental frequency components would be imposed on the DC link. It will be appreciated that fundamental frequency may refer to grid normal frequency (e.g., at or about 60 Hz in North America, at or about 50 Hz in China and/or Europe). Compared to three-phase AC-DC power conversion which can impose six-fundamental frequency components, single phase power conversion can require more capacitance to smooth out the ripple. Ideally, if there is no twice fundamental frequency with only high-frequency (e.g., high-kHz) switching ripple, the capacitor size can be further reduced. Also, cost and reliability may be negatively impacted by the large DC-link capacitor. In order to minimize the physical size of the power converter, a special circuit may be used in the power converter of the transport climate control system because physical size, especially volume space, may be of utmost concern for the electrified components of the transport climate control system. It will be appreciated that power converters may be disposed in locations that have constrained physical dimensions such as roofs of vehicles and frame rails of trucks. Such requirements may also lead to a desire to reduce total weight where weight may be a penalty. It will be appreciated that the electrical interface might vary (single-phase and/or three-phase AC power) as the device may use different permanent installations of different types.

It will also be appreciated that if the value of capacitance can be lowered (as described in the embodiments disclosed herein), different capacitor technology such as film capacitors can be used. This is because the extra cost of film capacitors can be neutralized by the reduced capacitance. Using film capacitors can improve the robustness of the product because high capacitance components can require electrolytic caps, and film capacitors may have better ripple current capability which leads to a higher reliability.

In an embodiment, a multipurpose power converter for converting power for a transport climate control system is provided. The multipurpose power converter includes a rectifier having a first leg, a second leg, and a third leg. The multipurpose power converter also includes a first switch, a second switch, and an inductor-capacitor network. The first switch and the second switch are connected to the third leg. The inductor-capacitor network is connected to the first switch. When the first switch is on and the second switch is off, the multipurpose power converter is configured as a single-phase power converter. When the first switch is off and the second switch is on, the multipurpose power converter is configured as a three-phase power converter.

In an embodiment, a transport climate control system is provided. The transport climate control system includes a multipurpose power converter, a DC-link capacitor, and a controller. The multipurpose power converter includes a rectifier having a first leg, a second leg, and a third leg. The multipurpose power converter also includes a first switch, a second switch, and an inductor-capacitor network. The first switch and the second switch are connected to the third leg. The inductor-capacitor network is connected to the first switch. When the first switch is on and the second switch is off, the multipurpose power converter is configured as a single-phase power converter. When the first switch is off and the second switch is on, the multipurpose power converter is configured as a three-phase power converter. The DC-link capacitor is connected to the multipurpose power converter. The controller is configured to control the first switch and the second switch.

In an embodiment, a method for controlling a multipurpose power converter for converting power for a transport climate control system is provided. The multipurpose power converter includes a rectifier having a first leg, a second leg, and a third leg. The multipurpose power converter also includes a first switch, a second switch, and an inductor-capacitor network. The first switch and the second switch are connected to the third leg. The inductor-capacitor network is connected to the first switch. The method includes controlling, by a controller, the first switch on and the second switch off, so that the multipurpose power converter is configured as a single-phase power converter. The method also includes controlling, by the controller, the first switch off and the second switch on, so that the multipurpose power converter is configured as a three-phase power converter.

It will be appreciated that the above embodiments are merely illustrative of the technical concept and features of the multipurpose power converter, and these embodiments are to provide a person skilled in the art with an understanding of the contents of the multipurpose power converter in order to implement the multipurpose power converter without limiting the scope of protection of the multipurpose power converter. Any features described in one embodiment may be combined with or incorporated/used into the other embodiment, and vice versa. The equivalent change or modification according to the substance of the multipurpose power converter should be covered by the scope of protection of the multipurpose power converter.

Other features and aspects will become apparent by consideration of the following detailed description and accompanying drawings.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

The present disclosure provides a detailed and specific description that refers to the accompanying drawings. The drawings and specific descriptions of the drawings, as well as any specific or alternative embodiments discussed, are intended to be read in conjunction with the entirety of this disclosure. The multipurpose power converter may, however, be embodied in many different forms and should not be construed as being limited to the embodiments set forth herein; rather, these embodiments are provided by way of illustration only and so that this disclosure will be thorough, complete and fully convey understanding to those skilled in the art.

References are made to the accompanying drawings that form a part of this disclosure and which illustrate the embodiments in which systems and methods described in this specification can be practiced.

Like reference numbers represent like parts throughout.

DETAILED DESCRIPTION

The embodiments described herein relate to methods and systems for controlling a multipurpose power converter for converting power for a transport climate control system.

As defined herein, the phrase "active filter" refers to a type of analog circuit implementing an electronic filter using active components. As defined herein, the phrase "passive component" may refer to either a component that consumes but does not produce energy (thermodynamic passivity) or a component that is incapable of power gain (incremental passivity). As defined herein, the phrase "active component" refers to a component that is not a passive component.

As defined herein, the phrase "switch" may refer to a switch, a Metal-Oxide-Semiconductor Field-Effect Transistor (MOSFET), an Insulated Gate Bipolar Transistor (IGBT), or a Bipolar Junction Transistor (BJT), or the like.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a", "an" and "the" include plural references unless the context clearly dictates otherwise. Although any systems and methods similar or equivalent to those described herein may be used in the practice or testing of embodiments of the present disclosure, the preferred, systems and methods are now described.

Particular embodiments of the present disclosure are described herein with reference to the accompanying drawings; however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements that may perform the same, similar, or equivalent functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential."

Figure 1A:
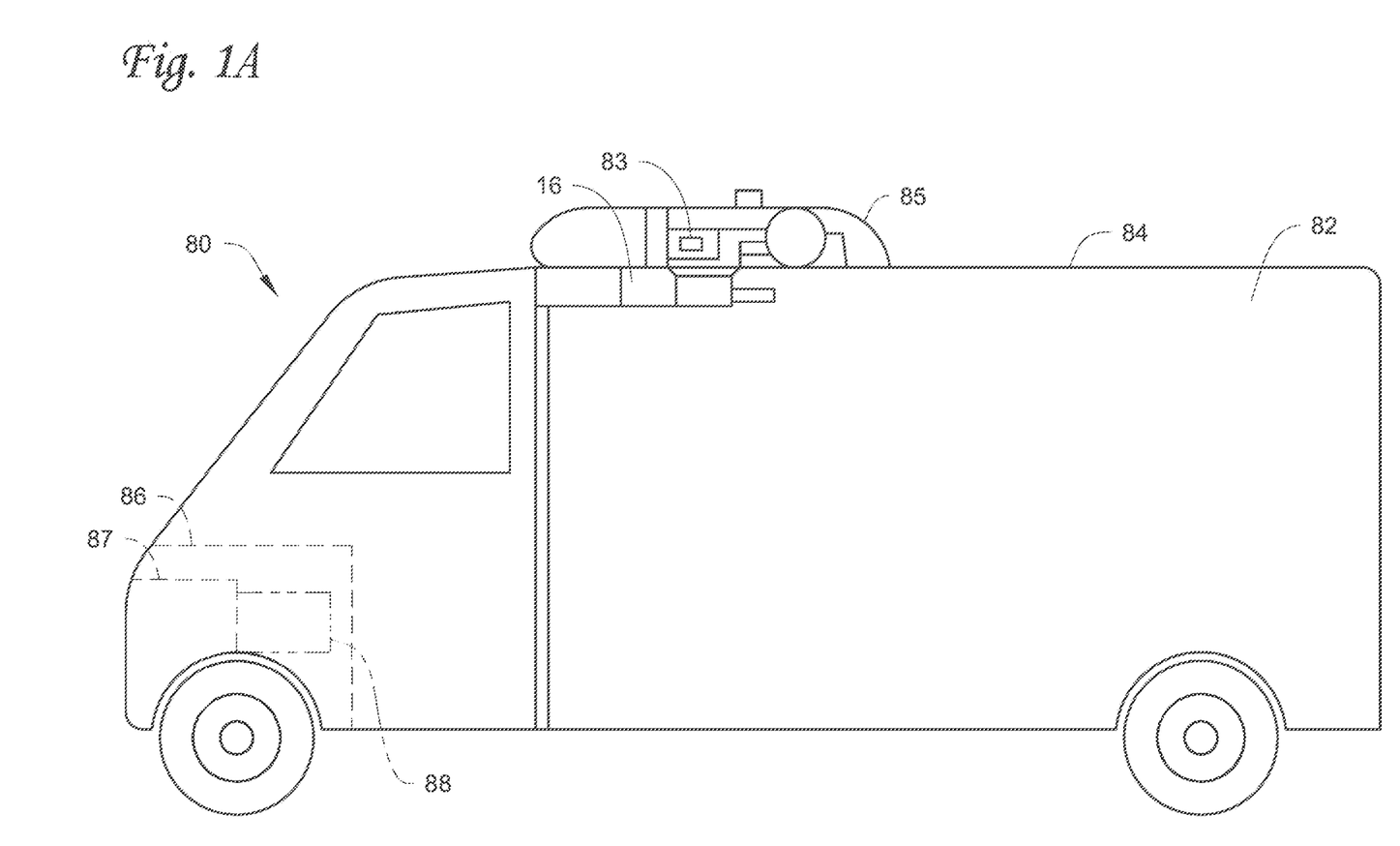
FIG. 1A illustrates a side view of a van with a roof mounted vehicle powered transport refrigeration unit, according to an embodiment.

FIG. 1A depicts a temperature-controlled van 80 that includes a conditioned load space 82 (or internal space) for carrying cargo. A transport refrigeration unit (TRU) 85 is mounted to a rooftop 84 of the load space 82. The TRU 85 is controlled via a controller 83 to provide temperature control within the load space 82. The van 80 further includes a vehicle power bay 86, which houses a prime mover 87, such as a combustion engine (e.g., diesel engine, etc.), that provides power to move the van 80 and to operate the TRU 85. In some embodiments, the prime mover 87 can work in combination with an optional machine 88 (e.g., an alternator) to operate the TRU 85. In one embodiment, the TRU 85 includes a vehicle electrical system. Also, in some embodiments, the van 80 can be a hybrid vehicle that is powered by the prime mover 87 in combination with a battery power source or can be an electrically driven truck in which the prime mover 87 is replaced with an electric power source (e.g., a battery power source). A multipurpose power converter system (see FIGS. 3A and 3B) can be configured to provide AC power to a load (e.g., compressor, fan/blower, motor, inverter circuit, etc.) of the TRU 85. In an embodiment, the multipurpose power converter system can be located within, for example, the TRU 85. In another embodiment, the multipurpose power converter system can be in a bay area outside of the TRU 85.

Figure 1B:
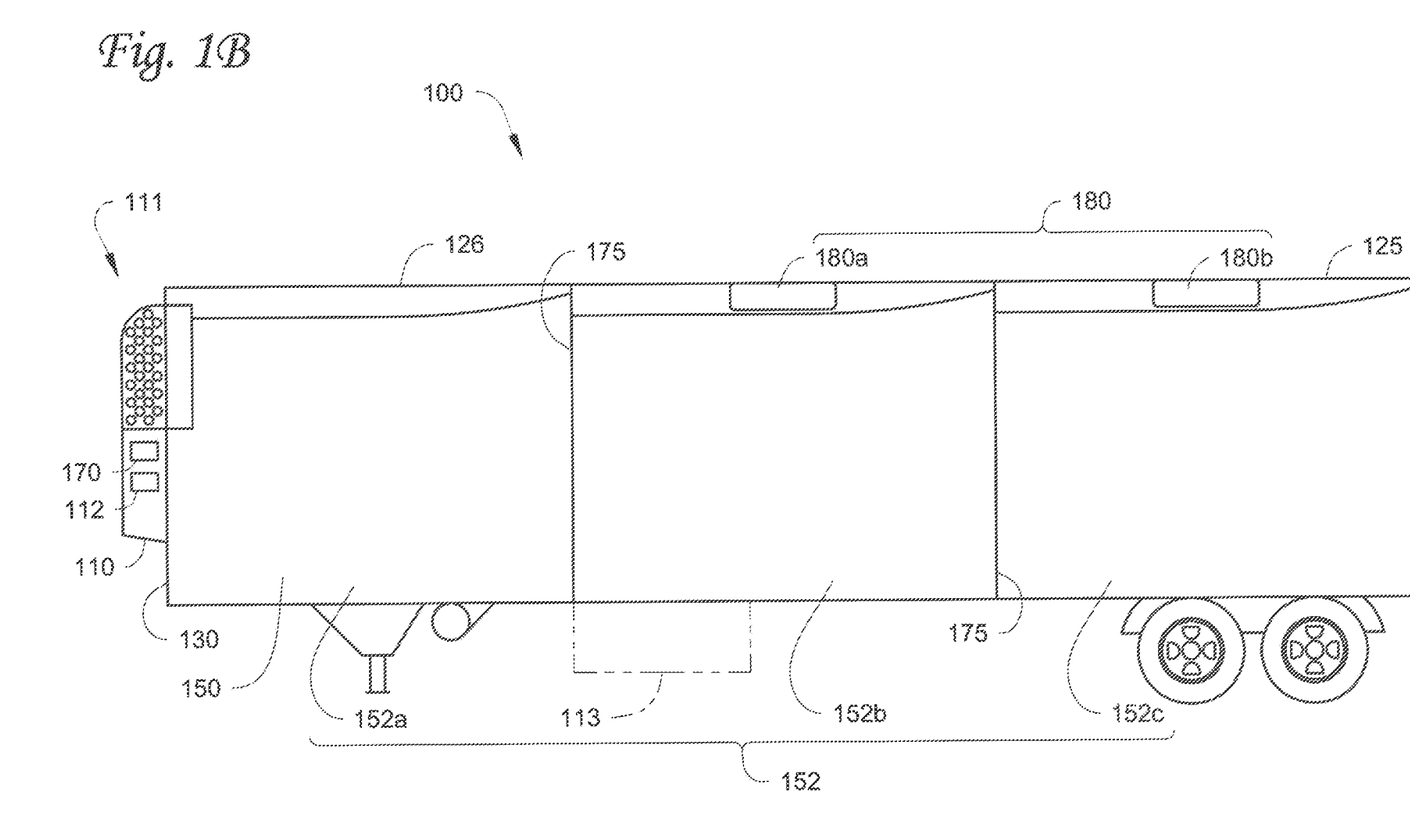
FIG. 1B illustrates a schematic cross sectional side view of a refrigerated transport unit with a multi-temp transport refrigeration system, according to an embodiment.

FIG. 1B illustrates one embodiment of a multi-zone transport refrigeration system (MTRS) 100 for a TU 125 that can be towed, for example, by a tractor (not shown). The MTRS 100 includes a TRU 110 that provides environmental control (e.g. temperature, humidity, air quality, etc.) within an internal space 150 of the TU 125. The MTRS 100 also includes a MTRS controller 170 and one or more sensors (e.g., Hall effect sensors, current transducers, etc.) that are configured to measure one or more parameters (e.g., ambient temperature, compressor suction pressure, compressor discharge pressure, supply air temperature, return air temperature, humidity, etc.) of the MTRS 100 and communicate parameter data to the MTRS controller 170. The MTRS 100 is powered by a power module 112. The TRU 110 is disposed on a front wall 130 of the TU 125. In other embodiments, it will be appreciated that the TRU 110 can be disposed, for example, on a rooftop 126 or another wall of the TU 125.

In some embodiments, the MTRS 100 can include an undermount unit 113. In some embodiments, the undermount unit 113 can be a TRU that can also provide environmental control (e.g. temperature, humidity, air quality, etc.) within the internal space 150 of the TU 125. The undermount unit 113 can work in combination with the TRU 110 to provide redundancy or can replace the TRU 110. Also, in some embodiments, the undermount unit 113 can be a power module that includes, for example, a generator that can help power the TRU 110.

The programmable MTRS Controller 170 may comprise a single integrated control unit or may comprise a distributed network of TRS control elements. The number of distributed control elements in a given network can depend upon the particular application of the principles described herein. The MTRS controller 170 is configured to control operation of the MTRS 100.

As shown in FIG. 1B, the power module 112 is disposed in the TRU 110. In other embodiments, the power module 112 can be separate from the TRU 110. Also, in some embodiments, the power module 112 can include two or more different power sources disposed within or outside of the TRU 110. In some embodiments, the power module 112 can include one or more of a prime mover, a battery, an alternator, a generator, a solar panel, a fuel cell, etc. Also, the prime mover can be a combustion engine or a microturbine engine and can operate as a two speed prime mover, a variable speed prime mover, etc. The power module 112 can provide power to, for example, the MTRS Controller 170, a compressor (not shown), a plurality of DC (Direct Current) components (not shown), a power management unit (not shown), etc. The DC components can be accessories or components of the MTRS 100 that require DC power to operate. Examples of the DC components can include, for example, DC fan motor(s) for a condenser fan or an evaporator blower (e.g., an Electrically Commutated Motor (ECM), a Brushless DC Motor (BLDC), etc.), a fuel pump, a drain tube heater, solenoid valves (e.g., controller pulsed control valves), etc.

The power module 112 can include a DC power source (not shown) for providing DC electrical power to the plurality of DC components (not shown), the power management unit (not shown), etc. The DC power source can receive mechanical and/or electrical power from, for example, a utility power source (e.g., utility power, shore power, grid power, etc.), a prime mover (e.g., a combustion engine such as a diesel engine, etc.) coupled with a generator machine (e.g., a belt-driven alternator, a direct drive generator, etc.), etc. For example, in some embodiments, mechanical energy generated by a diesel engine is converted into electrical energy via a generator machine. The electrical energy generated via the belt driven alternator is then converted into DC electrical power via, for example, a bi-directional voltage converter. The bi-directional voltage converter can be a bi-directional multi-battery voltage converter.

The internal space 150 can be divided into a plurality of zones 152*a-c*. The term "zone" means a part of an area of the internal space 150 separated by walls 175. It will be appreciated that the embodiments disclosed herein can also be used in a single zone TRS.

The MTRS 100 for the TU 125 includes the TRU 110 and a plurality of remote evaporator units 180. In some embodiments, an HVAC system can be powered by an Auxiliary Power Unit (APU, see FIG. 1C). The APU can be operated when a main prime mover providing power to the MTRS 100 is turned off such as, for example, when a driver parks the TU 125 for an extended period of time to rest. The APU can provide, for example, power to operate a secondary HVAC system to provide conditioned air to a cabin of the TU 125. The APU can also provide power to operate cabin accessories within the cabin such as a television, a microwave, a coffee maker, a refrigerator, etc. The APU can be a mechanically driven APU (e.g., prime mover driven) or an electrically driven APU (e.g., battery driven).

The tractor towing the TU 125 can include a vehicle electrical system for supplying electrical power to the electrical loads of the tractor, the MTRS 100, and/or components (e.g., lights, door sensors, gate lifts, etc.) of the TU 125. A multipurpose power converter system (see FIGS. 3A and 3B) can be configured to provide AC power to a load (e.g., compressor, fan/blower, motor, inverter circuit, etc.) of the MTRS 100. In an embodiment, the multipurpose power converter system can be located within, for example, the TRU 111. In another embodiment, the multipurpose power converter system can be in a bay area outside of the TRU 111.

Figure 1C:
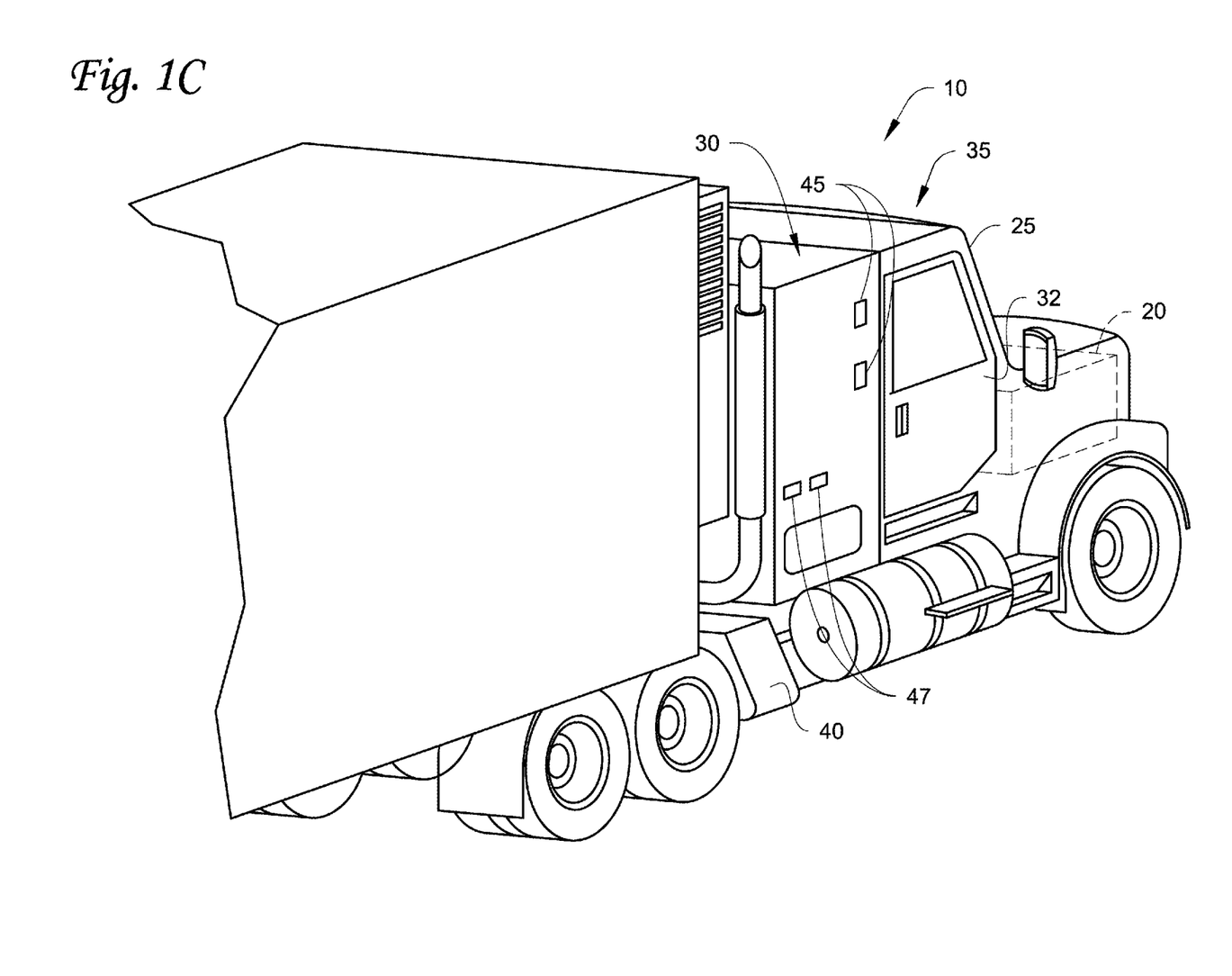
FIG. 1C illustrates a perspective view of a vehicle, according to an embodiment.

FIG. 1C illustrates a vehicle 10 according to one embodiment. The vehicle 10 is a semi-tractor that can be used to transport cargo stored in a transport unit (e.g., a container, a trailer, etc.) to one or more destinations. Hereinafter, the term "vehicle" shall be used to represent all such tractors and trucks, and shall not be construed to limit the present application solely to a tractor in a tractor-trailer combination. In some embodiments, the vehicle 10 can be, for example, a straight truck, van, etc.

The vehicle 10 includes a primary power source 20, a cabin 25 defining a sleeping portion 30 and a driving portion 35, an APU 40, and a plurality of vehicle accessory components 45 (e.g., electronic communication devices, cabin lights, a primary and/or secondary HVAC system, primary and/or secondary HVAC fan(s), sunshade(s) for a window/windshield of the vehicle 10, cabin accessories, etc.). The cabin 25 can be accessible via a driver side door (not shown) and a passenger side door 32. The cabin 25 can include a primary HVAC system (not shown) that can be configured to provide conditioned air within driving portion 35 and potentially the entire cabin 25, and a secondary HVAC system (not shown) for providing conditioned air within the sleeping portion 30 of the cabin 25. The cabin 25 can also include a plurality of cabin accessories (not shown). Examples of cabin accessories can include, for example, a refrigerator, a television, a video game console, a microwave, device charging station(s), a continuous positive airway pressure (CPAP) machine, a coffee maker, a secondary HVAC system for providing conditioned air to the sleeping portion 30, etc.

The primary power source 20 can provide sufficient power to operate (e.g., drive) the vehicle 10 and any of the plurality of vehicle accessory components 45 and cabin accessory components 47. The primary power source 20 can also provide power to the primary HVAC system and the secondary HVAC system. In some embodiments, the primary power source can be a prime mover such as, for example, a combustion engine (e.g., a diesel engine, etc.).

The APU 40 is a secondary power unit for the vehicle 10 when the primary power source 20 is unavailable. When, for example, the primary power source 20 is unavailable, the APU 40 can be configured to provide power to one or more of the vehicle accessory components, the cabin accessories, the primary HVAC system and the secondary HVAC system. In some embodiments, the APU 40 can be an electric powered APU. In other embodiments, the APU 40 can be a prime mover powered APU. The APU 40 can be attached to the vehicle 10 using any attachment method. In some embodiments, the APU 40 can be turned on (i.e., activated) or off (i.e., deactivated) by an occupant (e.g., driver or passenger) of the vehicle 10. The APU 40 generally does not provide sufficient power for operating (e.g., driving) the vehicle 10. The APU 40 can be controlled by an APU controller 41. A multipurpose power converter system (see FIGS. 3A and 3B) can be configured to provide AC power to a load (e.g., compressor, fan/blower, motor, inverter circuit, etc.) of the vehicle 10. In an embodiment, the multipurpose power converter system can be located within, for example, the semi-tractor.

Figure 1D:
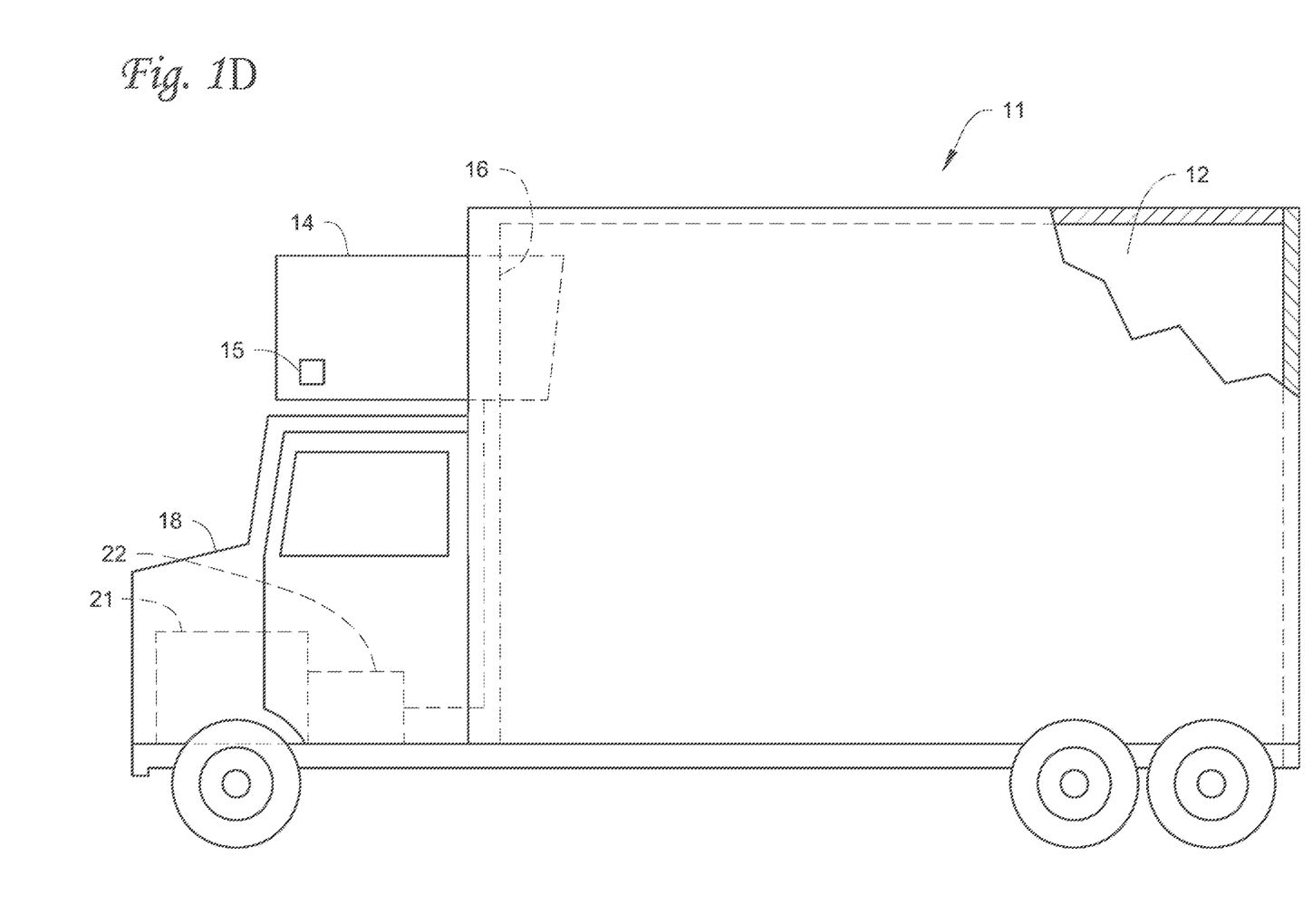
FIG. 1D illustrates a side view of a truck with a front wall mounted vehicle powered transport refrigeration unit, according to an embodiment.

FIG. 1D depicts a temperature-controlled straight truck 11 that includes a conditioned load space 12 for carrying cargo. A transport refrigeration unit (TRU) 14 is mounted to a front wall 16 of the load space 12. The TRU 14 is controlled via a controller 15 to provide temperature control within the load space 12. The truck 11 further includes a vehicle power bay 18, which houses a prime mover 21, such as a combustion engine (e.g., diesel engine, etc.), that provides power to move the truck 11 and to operate the TRU 14. In some embodiments, the prime mover 21 can work in combination with an optional machine 22 (e.g., an alternator) to operate the TRU 14. In one embodiment, the TRU 14 includes a vehicle electrical system. Also, in some embodiments, the truck 11 can be a hybrid vehicle that is powered by the prime mover 21 in combination with a battery power source or can be an electrically driven truck in which the prime mover 21 is replaced with an electric power source (e.g., a battery power source).

While FIG. 1D illustrates a temperature-controlled straight truck 11, it will be appreciated that the embodiments described herein can also apply to any other type of transport unit including, but not limited to, a container (such as a container on a flat car, an intermodal container, etc.), a box car, or other similar transport unit. A multipurpose power converter system (see FIGS. 3A and 3B) can be configured to provide AC power to a load (e.g., compressor, fan/blower, motor, inverter circuit, etc.) of the TRU 14. In an embodiment, the multipurpose power converter system can be located within, for example, the TRU 14. In another embodiment, the multipurpose power converter system can be in a bay area outside of the TRU 14.

Figure 2:
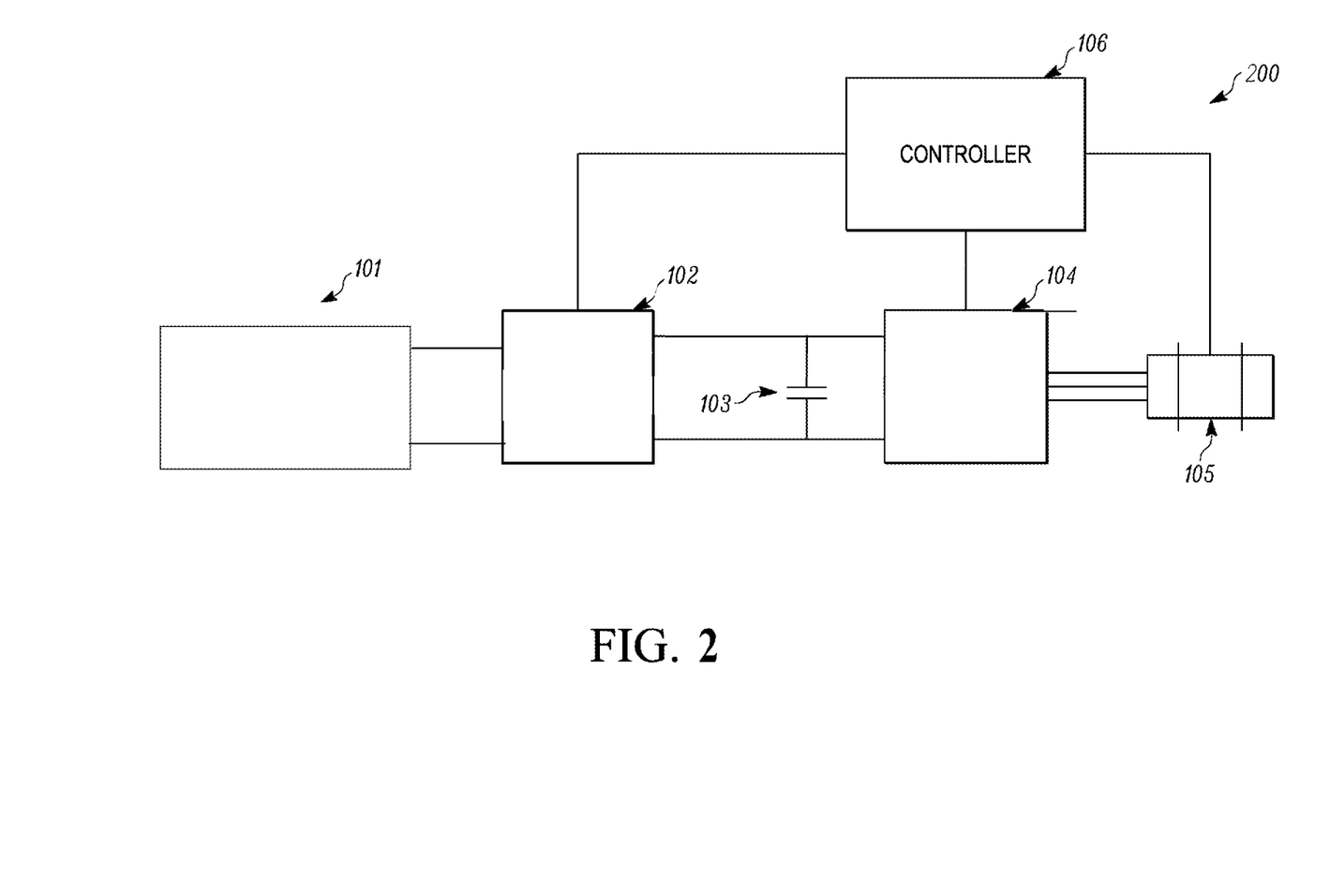
FIG. 2 is a schematic illustration of a multipurpose power converter control system for a transport climate control system, according to an embodiment.

FIG. 2 is a schematic illustration of a multipurpose power converter control system 200 for a transport climate control system, according to an embodiment. The transport climate control system can include, for example, the transport refrigeration unit/system of FIGS. 1A-1D. The control system 200 includes a multiple purpose power converter 102 connected to a power source 101, a DC-link capacitor 103, a load (104, 105), and a controller 106. It will be appreciated that in an embodiment, the DC-link capacitor 103 can be part of the multiple purpose power converter 102. In an embodiment, the load includes an inverter circuit 104 and an AC load 105. In another embodiment, the load (104, 105) may be any suitable load requiring DC power (e.g., voltage source inverter, DC-to-DC converter, etc.).

The power source 101 may be a utility power source, a vehicle mounted generator, an offboard generator, etc. It will be appreciated that the power source 101 can be an engine driven generator, a genset (offboard generator), single phase utility power, and/or three-phase utility power. The vehicle can encounter any of those power sources and may be able to reconfigure as needed in an efficient manner. In an embodiment, the power source 101 may be a single-phase AC utility power source or a three-phase AC utility power source. The power source 101 provides an input AC voltage to the multiple purpose power converter 102. In will be appreciated that the power source 101 is not limited to the examples discussed above and can be any suitable power source. In some embodiments, the power source 101 is a utility power source (or shore power source or grid power source) that can be removably attached to the multipurpose power converter control system 200.

The multiple purpose power converter 102 is configured to receive the input AC voltage from the power source 101. The multiple purpose power converter 102 is configured to convert the input AC voltage from the power source 101 to an output DC voltage that is then directed to the DC-link capacitor 103.

The DC-link capacitor 103 is configured to store the power obtained from the multiple purpose power converter 102 while the power is being provided to the load (104, 105). In an embodiment, the power from the DC-link capacitor 103 may be converted back to AC power via the inverter circuit 104. In another embodiment, the power from the DC-link capacitor 103 may be configured to power a DC load.

The inverter circuit 104 is configured to convert the voltage outputted by the multiple purpose power converter 102 to an AC voltage to drive the AC load 105. In some embodiments, the inverter circuit 104 (sometimes called an inverter bridge) can include one or more switches (not shown). The switches can be controlled on and/or off to generate a variable power (for example, variable frequency, variable current, variable voltage, etc.) from an input DC voltage (i.e. the voltage outputted by the multiple purpose power converter 102) to drive the AC load 105. Matching the converted AC voltage with the voltage demanded by the AC load 105 can be an efficient way to utilize the energy from the power source 101 to enable the AC load 105 (e.g., a motor, a compressor, etc.) to work properly and/or to prevent premature motor failure. Converting a full AC voltage to a corresponding AC voltage can be an efficient conversion for the inverter circuit 104 to reduce energy loss during conversion. The multipurpose power converter control system 200 also includes a controller 106 configured to control the multiple purpose power converter 102. In some embodiments, the controller 106 can be configured to instruct the multiple purpose power converter 102 to operate as a single-phase power converter or as a three-phase power converter.

The AC load 105 can be driven by the converted AC voltage from the inverter circuit 104. In some embodiments, the AC load 105 can be, for example, a compressor (not shown), one or more fans and/or blowers, etc. In some embodiments, the compressor can be a variable speed compressor, a two-speed compressor, or a fixed speed compressor of the transport climate control system. In some embodiments, each of the one or more fans and/or blowers can be a variable speed fan/blower, a two-speed fan/blower, or a fixed speed fan/blower of the transport climate control system.

The controller 106 is configured to control the multiple purpose power converter 102 based on the power source 101 (e.g., single-phase or three-phase AC power). In one embodiment, the controller 106 can receive data from a plurality of sensors (not shown). The plurality of sensors can monitor a plurality of parameters such as, an output AC voltage/current/frequency/phases/power from the power source 101, an output AC voltage/current/frequency of the inverter circuit 104, switching frequency of the multipurpose power converter 102, etc. Further detail of controlling the multiple purpose power converter 102 using the controller 106 can be found in the description of FIGS. 3A and 3B.

Figure 3A:
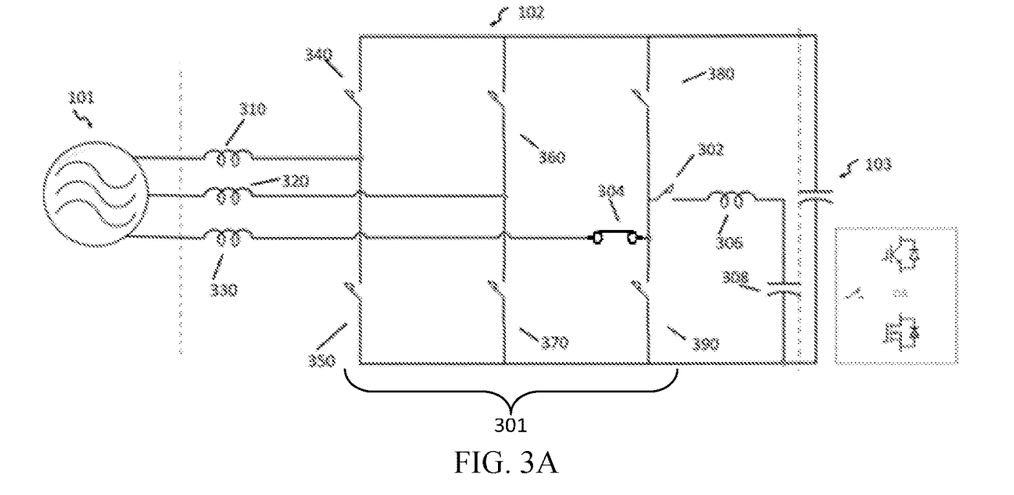
FIG. 3A is a schematic illustration of a multipurpose power converter for a transport climate control system, according to an embodiment.
Figure 3B:
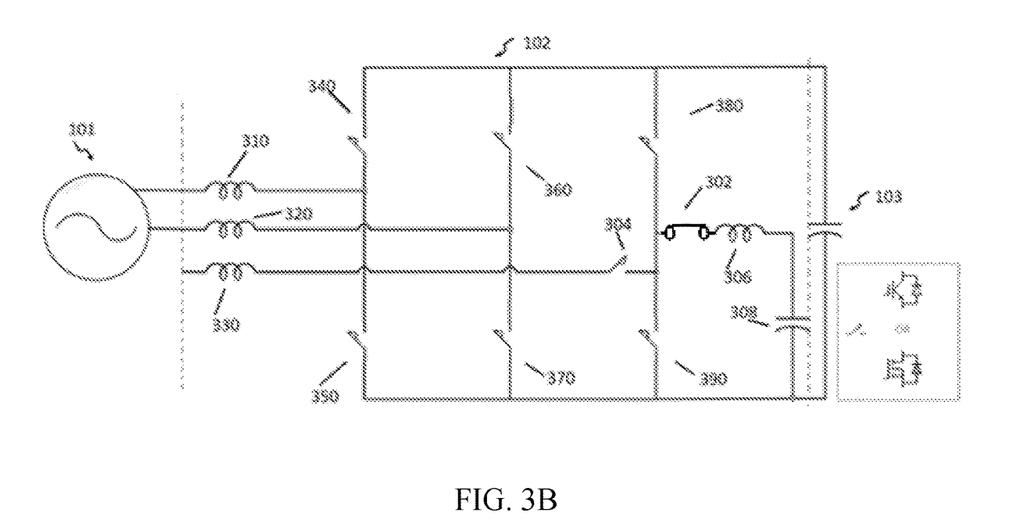
FIG. 3B is another schematic illustration of the multipurpose power converter of FIG. 3A, according to an embodiment.

FIG. 3A is a schematic illustration of the multipurpose power converter 102 for a transport climate control system, according to an embodiment. FIG. 3B is another schematic illustration of the multipurpose power converter 102 of FIG. 3A, according to an embodiment. It will be appreciated that to show the features clearly, for illustration purpose, in FIGS. 3A and 3B, the power source 101 and the DC-link capacitor 103 are also shown. In FIG. 3A, the power source 101 is a three-phase AC power source connected to three legs of the multipurpose power converter 102. In FIG. 3B, the power source 101 is a single-phase AC power source connected to two legs of the multipurpose power converter 102.

The multipurpose power converter 102 includes a first input inductor 310, a second input inductor 320, and a third input inductor 330. In an embodiment, the inductors (310, 320, 330) may be optional. It will be appreciated that without the inductors (310, 320, 330), the ability to boost voltage may be lost. If a generator is a power input, then the inductance (310, 320, 330) may not be required as the inductance of the generator windings can be sufficient, or the inductance value may be small. In an embodiment, e.g., for a grid connected application, the inductance (310, 320, 330) may depend on the power rating of the application. For example, the inductance of inductors (310, 320, 330) can be at or about 0.5 mH for an at or about 10 kW application. In FIG. 3A, the first (left) ends of the inductors (310, 320, 330) are connected to the three-phase power source 101. In FIG. 3B, the first (left) ends of the inductors (310, 320) are connected to the single-phase power source 101, and the inductor 330 is disconnected (not used).

The multipurpose power converter 102 also includes a rectifier 301 that includes a first leg (or "half-bridge" or "phase leg"), a second leg, and a third leg. In an embodiment, the rectifier 301 may be a pulse width modulation (PWM) rectifier. The first leg includes a switch 340 and a switch 350. The second leg includes a switch 360 and a switch 370. The third leg includes a switch 380 and a switch 390. It will be appreciated that the switches (340, 350, 360, 370, 380, 390) may be active switches, e.g., normally-off switches such as metal-oxide-semiconductor field-effect transistor (MOSFET), insulated-gate bipolar transistor (IGBT), etc. (see dotted line box at the right side of FIGS. 3A and 3B)

The second (right) ends of the inductors (310, 320) are connected to the second (bottom) ends of the switches (340, 360) and the first (top) ends of the switches (350, 370), respectively. The second (right) end of the inductor 330 is connected to an end (left end) of a switch 304, and the other end (right end) of the switch 304 is connected to the second (bottom) end of the switch 380 and the first (top) end of the switch 390.

An end (left end) of the switch 302 is connected to the other end (right end) of the switch 304, the second (bottom) end of the switch 380, and the first (top) end of the switch 390. Another end (right end) of the switch 302 is connected to an end (left end) of an inductor 306 of an LC (inductor-capacitor) network (306, 308). It will be appreciated that the capacitance of the LC network (306, 308) used for this filtering may be less than the capacitance if only capacitor (passive filtering) in the DC link is used. In an embodiment, the inductance of L can be at or about 3.5 uH/kW and the capacitance of C can be at or about 10 uF/kW. The LC network (306, 308) includes the inductor 306 connected to a capacitor 308 in series. The first (top) ends of the switches (340, 360, 380) are connected to a first (top) end of the DC-link capacitor 103. The second (bottom) ends of the switches (350, 370, 390) and another end (bottom end) of the capacitor 308 are connected to a second (bottom) end of the DC-link capacitor 103. In an embodiment, the switches (302, 304) may be active switches.

In operation, a controller (not shown, see controller 83 of FIG. 1A, 170 of FIG. 1B, 41 of FIG. 1C, 15 of FIG. 1D, and/or 106 of FIG. 2) is configured to control the switches (302, 304). It will be appreciated that the power source 101 may be a reconfigurable shore power input power source. When the power source 101 is a three-phase AC power source (e.g., which is detected/sensed by a sensor and communicated to the controller), the controller is configured to switch the switch 302 to an off state (disconnected, open) and to switch the switch 304 to an on state (connected, closed), so that the LC network (306, 308) is switched off (disconnected, not used, and thus may not affect normal operation and/or may not incur losses), and the multipurpose power converter 102 is configured as a three-phase power converter. It will be appreciated that switching the switches (302, 304) may need to be performed before any power flow or current is conducting. The DC-link capacitor 103 is configured to maintain the DC bus voltage.

When the power source 101 is a single-phase AC power source (e.g., which is detected/sensed by a sensor and communicated to the controller), the controller is configured to switch the switch 302 to an on state (connected, closed) and to switch the switch 304 to an off state (disconnected, open), so that the LC network (306, 308) is connected (used) in the multipurpose power converter 102, and the multipurpose power converter 102 is configured as a single-phase power converter. It will be appreciated that switching the switches (302, 304) may be required to be performed before any power flow or current is conducting in the single-phase configuration protect the switches (302, 304). As such, if there is a potential for inrush current to capacitor C then the switches (302, 304) are not switched. It will be appreciated that the diodes may rectify the power source and allow the DC link to charge even if switches are off. In an embodiment, the switch 304 can be pulsed to limit current to capacitor 103 when switching from single phase to three-phase. In another embodiment, the switch 302 can be pulsed to limit the current into the LC network (306, 308), and the inductor L may limit inrush to a predetermined extent.

In such single-phase power converter configuration, the third leg (the switches 380, 390) and the LC network (306, 308) operate as an active filter (e.g., a buck type active filter) to serve as a ripple power absorber. The third leg (e.g., the switch elements in the switches 380, 390) is configured to control the LC network (306, 308). The third leg (the switches 380, 390) may enable higher power density single-phase operation while providing support for typical three-phase operation. It will be appreciated that the third leg may be used under three-phase operation which does not incur extra power semiconductor cost, and thus the multipurpose power converter 102 can optimize filtering while reducing cost and physical volume. The net capacitance for the single-phase configuration may be reduced. The overall physical size of the power converter 102 may be reduced by shuffling some power to the LC network (306, 308) and distributing energy to different components. It will be appreciated that different embodiments of reducing a physical size of a single-phase power converter are described in U.S. Pat. Nos. 9,071,141 and 8,570,774, which are hereby incorporated by reference in their entirely, where the third leg (the switches 380, 390) plays a role in physical size reduction instead of being idle in single-phase operation. The first and second legs (the switches 340, 350, 360, 370) form an H-bridge.

It will be appreciated that in an embodiment, when the multipurpose power converter 102 is connected to a single-phase AC power source, the power limit typically allowed from the grid can be at or about 3.5 kW (kilowatts). In North America, at or about 120 Vac (at or about 60 Hz) single phase at or about 1.5 kW power, or at or about 230 Vac (7 kW power, single phase or three-phase) may be the most common voltage level; while in Europe, at or about 230 Vac (at or about 50 Hz) single phase at or about 3 kW power, or at or about 400 Vac three-phase may be the most common voltage level. The multipurpose power converter 102 may work in both regions, and may take input AC voltage and rectify the input AC voltage to DC voltage. In an embodiment, at or about 400 Vdc may be the target value for rectification.

It will be appreciated that without the active filter (of the multipurpose power converter 102), due to the nature of single-phase power conversion, there may be ripple power on the DC output. In such case, in order to lower the ripple power, more filtering DC-link capacitors (or capacitor with higher capacitance) may need to be placed in the circuit to e.g., absorb the generated ripple power. When a rectifier structure is an H-bridge and the required DC voltage ripple is at or about 3%, the capacitance of the DC-link capacitor may be $P/(2\pi*f*V_{dc}*\Delta V_{dc})$, where P is the power limit (e.g., 3500 Watts) allowed from the gird, f is the grid frequency (e.g., 50 Hz in Europe), $V_{dc}$ is the target rectification DC voltage (e.g., 400V), and $\Delta V_{dc}$ is DC voltage ripple (e.g., 3%*400V). As such, without the active filter (of the multipurpose power converter 102), the capacitance of the DC-link capacitor may be at or about 2.3 millifarad. In an embodiment, for a one kilo-watts operation, the DC-link capacitor may be in a range of at or about 0.1 millifarad to at or about 2 millifarad for a target rectification DC voltage from at or about 250 volts to at or about 500 volts.

It will also be appreciated that for a three-phase AC power source, higher power (e.g., 6.5 kWatts) may be allowed from the grid. In a regular three-phase configuration (e.g., without the active filter of the multipurpose power converter 102), the required DC-link capacitance may be $P/(4*f_s*V_{dc}*\Delta V_{dc})$, where P is the power limit (e.g., 6500 Watts) allowed from the gird, $f_s$ is the switching frequency (e.g., 10 kHz), $V_{dc}$ is the target rectification DC voltage (e.g., 400V), and $\Delta V_{dc}$ is DC voltage ripple (e.g., 3%*400V). As such, the required DC-link capacitance may be at or about 40 microfarad.

It can be seen that even if the power level for single-phase operation (e.g., 3500 Watts) and three phase operation (e.g., 6500 Watts) is about two times apart, the DC-link capacitances (at or about 2.3 millifarad versus at or about 40 microfarad) are about 50 times apart. In another example, in order to provide stable DC-link with at or about 5% ripple under single-phase grid, a physically bulky DC-link capacitor may be needed. For the three-phase grid, to get stable DC-link with at or about 5% ripple, at or about 10% of the single-phase DC-link capacitances may be required. As such, integrating single-phase function along with three-phase function (into a single multi-purpose power converter) may face challenges in terms of physical space required for DC-link capacitors. For example, if a 3.5 kW single-phase power converter is size X, and a 6.5 kW three-phase power converter is size Y, then Y may be 25 times smaller than X. In order to accommodate both the single-phase and three-phase features together in one unit (e.g., a multi-purpose power converter), the power converter size may need to be X.

Embodiments (e.g., the multi-purpose power converter 102 with the active filter for the single-phase configuration) disclosed herein may address the DC-link capacitor size issue and provide a higher power density apparatus which can provide both single-phase and three-phase rectification with reduced DC-link capacitor. With the multi-purpose power converter 102 having the active filter for the single-phase configuration, the required DC-link capacitance may be the same as the DC-link capacitance in the regular three-phase configuration (e.g., at or about 40 microfarad, or 1/25 of the DC-link capacitance of the single-phase configuration without the active filter). It will be appreciated that most existing applications are for permanent power sources, e.g., single phase only and never three-phase. As such, users may not have any motivation to move to different power sources and switches between single phase and three-phase during product life, and adding active filtering may not have an increased benefit. When users require single phase and three-phase in a same design, then there can be the added benefit as users may need the third leg. As such, one skilled in the art may not be motivated to add an active filter to achieve the single-phase configuration while providing a three-phase configuration as well. With the multi-purpose power converter 102, the total size (including the reduced DC-link capacitor with the additional size from the LC network (306, 308) and the switches (302, 304) of the multi-purpose power converter 102 may be at or about 50% of the total size of a single-phase power converter (without the multi-purpose power converter 102 but including the unreduced size of the DC-link capacitor).

Embodiments disclosed herein may address the DC-link capacitor size issue and provide a single apparatus (e.g., the multi-purpose power converter 102) that can be configured as single-phase and/or three-phase power converter with reduced DC-link capacitor, and thus may improve flexibility, lower the cost, reduce the physical size of the component while maintaining or improving performance.

Figure 4:
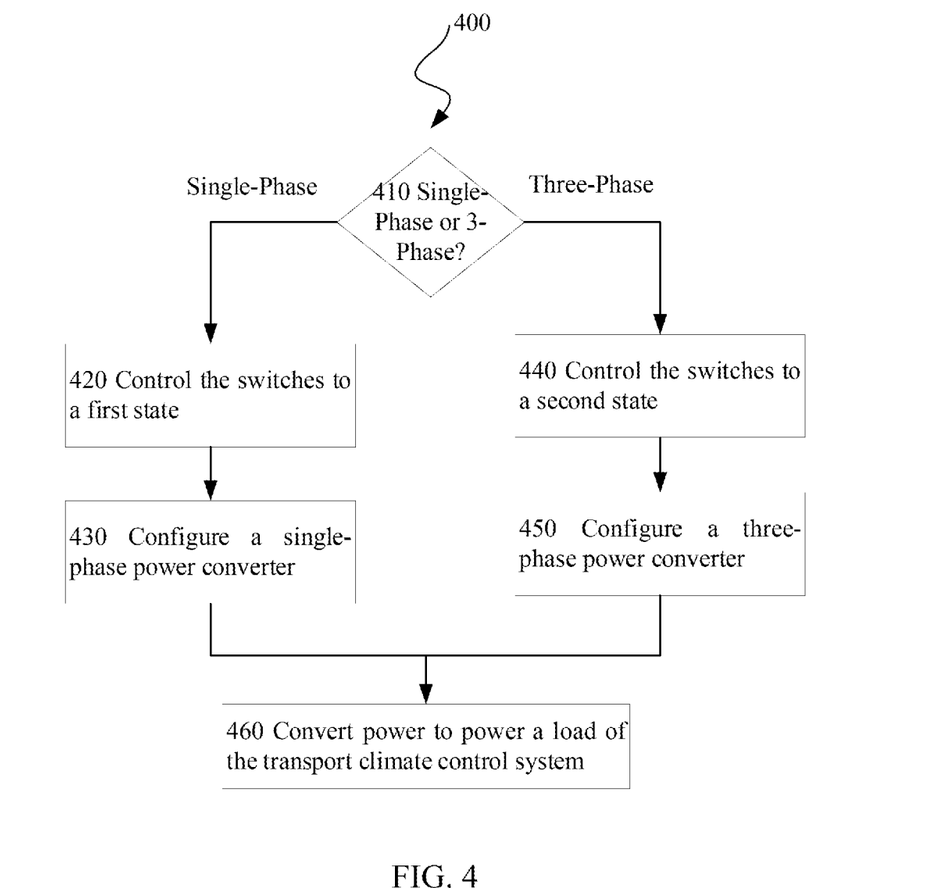
FIG. 4 is a flow chart illustrating a method for controlling a multipurpose power converter, according to an embodiment.

FIG. 4 is a flow chart illustrating a method 400 for controlling a multipurpose power converter, according to an embodiment. As shown in FIG. 4, the method 400 begins at 410, where a controller (see controller 83 of FIG. 1A, 170 of FIG. 1B, 41 of FIG. 1C, 15 of FIG. 1D, and/or 106 of FIG. 2) is configured to determine if the power source (see 101 of FIGS. 3A and 3B) is providing single-phase AC power or three-phase AC power. If the power source is providing single-phase AC power, the method 400 proceeds to 420. If the power source is three-phase AC power, the method 400 proceeds to 440.

At 420, the controller controls the switches (see 302, 304 of FIGS. 3A and 3B) to a first state (e.g., 302 on, 304 off). The method 400 proceeds to 430. At 430, the multi-purpose power converter (see 102 of FIGS. 3A and 3B) is configured as a single-phase power converter. The method 400 proceeds to 460.

At 440, the controller controls the switches (see 302, 304 of FIGS. 3A and 3B) to a second state (e.g., 302 off, 304 on). The method 400 proceeds to 450. At 450, the multi-purpose power converter (see 102 of FIGS. 3A and 3B) is configured as a three-phase power converter.

At 460, the multi-purpose power converter provides power (from the power source) to power a load of the transport climate control system.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "able to operably coupled", to each other to achieve the desired functionality.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting.

Aspects:

It is appreciated that any of the aspects can be combined with each other.

Aspect 1. A multipurpose power converter for converting power for a transport climate control system, the multipurpose power converter comprising:
    a rectifier having a first leg, a second leg, and a third leg;
    a first switch and a second switch; and
    an inductor-capacitor network,
    wherein the first switch and the second switch are connected to the third leg;
    the inductor-capacitor network is connected to the first switch;
    when the first switch is on and the second switch is off, the multipurpose power converter is configured as a single-phase AC power converter; and
    when the first switch is off and the second switch is on, the multipurpose power converter is configured as a three-phase AC power converter.

Aspect 2. The multipurpose power converter according to aspect 1, wherein the third leg includes a connection point between a first active switch and a second active switch, and
    a first end of the first switch and a first end of the second switch are connected to the connection point.

Aspect 3. The multipurpose power converter according to aspect 2, wherein a second end of the first switch is connected to an inductor of the inductor-capacitor network.

Aspect 4. The multipurpose power converter according to any one of aspects 1-3, wherein when the first switch is on and the second switch is off, the third leg and the inductor-capacitor network are configured as an active filter in the single-phase AC power converter.

Aspect 5. The multipurpose power converter according to any one of aspects 1-4, wherein when the first switch is off and the second switch is on, the inductor-capacitor network is switched off in the three-phase AC power converter.

Aspect 6. A multipurpose power converter system configured to provide AC power to a load of a transport climate control system, the multipurpose power converter system comprising:
    a multipurpose power converter including:
    a rectifier having a first leg, a second leg, and a third leg;
    a first switch and a second switch; and
    an inductor-capacitor network, wherein the first switch and the second switch are connected to the third leg;
the inductor-capacitor network is connected to the first switch;
when the first switch is on and the second switch is off, the multipurpose power converter is configured as a single-phase AC power converter; and
when the first switch is off and the second switch is on, the multipurpose power converter is configured as a three-phase AC power converter;
a DC-link capacitor; and
a controller,
wherein the DC-link capacitor is connected to the multipurpose power converter, and
the controller is configured to control the first switch and the second switch.

Aspect 7. The multipurpose power converter according to aspect 6, wherein the third leg includes a connection point between a first active switch and a second active switch, and
a first end of the first switch and a first end of the second switch are connected to the connection point.

Aspect 8. The multipurpose power converter according to aspect 7, wherein a second end of the first switch is connected to an inductor of the inductor-capacitor network, and
a capacitor of the inductor-capacitor network is connected to the DC-link capacitor.

Aspect 9. The multipurpose power converter according to any one of aspects 6-8, wherein when the first switch is on and the second switch is off, the third leg and the inductor-capacitor network are configured as an active filter in the single-phase AC power converter.

Aspect 10. The multipurpose power converter according to any one of aspects 6-9, wherein when the first switch is off and the second switch is on, the inductor-capacitor network is switched off in the three-phase AC power converter.

Aspect 11. The multipurpose power converter according to any one of aspects 6-10, wherein when a single-phase AC utility power is powering the transport climate control system, the controller is configured to switch the first switch on and to switch the second switch off.

Aspect 12. The multipurpose power converter according to any one of aspects 6-11, wherein when a three-phase AC utility power is powering the transport climate control system, the controller is configured to switch the first switch off and to switch the second switch on.

Aspect 13. The multipurpose power converter according to any one of aspects 6-12, further comprising a load, the multipurpose power converter and the DC-link capacitor are configured to provide power to the load.

Aspect 14. The multipurpose power converter according to aspect 13, wherein the load includes an inverter circuit.

Aspect 15. A method for controlling a multipurpose power converter for converting power for a transport climate control system, the multipurpose power converter including a rectifier having a first leg, a second leg, and a third leg; a first switch and a second switch; and an inductor-capacitor network, the first switch and the second switch are connected to the third leg; and the inductor-capacitor network is connected to the first switch;
the method comprising:
determining that the multipurpose power converter is connected to one of a single-phase AC power source and a three-phase AC power source;
when the multipurpose power converter is connected to a single-phase AC power source, controlling, by a controller, the first switch on and the second switch off, so that the multipurpose power converter is configured as a single-phase AC power converter; and
when the multipurpose power converter is connected to a three-phase AC power source, controlling, by the controller, the first switch off and the second switch on, so that the multipurpose power converter is configured as a three-phase AC power converter.

Aspect 16. The transport climate control system according to aspect 15, wherein the third leg includes a connection point between a first active switch and a second active switch, and
a first end of the first switch and a first end of the second switch are connected to the connection point.

Aspect 17. The transport climate control system according to aspect 15 or aspect 16, wherein a second end of the first switch is connected to an inductor of the inductor-capacitor network, and
a capacitor of the inductor-capacitor network is connected to a DC-link capacitor.

Aspect 18. The transport climate control system according to any one of aspects 15-17, wherein when the first switch is on and the second switch is off, the third leg and the inductor-capacitor network are configured as an active filter in the single-phase AC power converter.

Aspect 19. The transport climate control system according to aspects 15-18, wherein when the first switch is off and the second switch is on, the inductor-capacitor network is switched off in the three-phase AC power converter.

Aspect 20. The transport climate control system according to aspects 15-19, wherein the multipurpose power converter and a DC-link capacitor are configured to provide power to a load.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A multipurpose power converter for converting power for a transport climate control system, the multipurpose power converter comprising:
a rectifier having a first leg, a second leg, and a third leg;
a first switch and a second switch; and
an inductor-capacitor network,
wherein the first switch and the second switch are connected to the third leg, the second switch being between a power source and the third leg;
the inductor-capacitor network is connected to the first switch, the first switch being between the third leg and the inductor-capacitor network;
when the first switch is on and the second switch is off, the multipurpose power converter is configured as a single-phase AC power converter; and when the first switch is off and the second switch is on, the multipurpose power converter is configured as a three-phase AC power converter.

2. The multipurpose power converter according to claim 1, wherein the third leg includes a connection point between a first active switch and a second active switch, and a first end of the first switch and a first end of the second switch are connected to the connection point.

3. The multipurpose power converter according to claim 2, wherein a second end of the first switch is connected to an inductor of the inductor-capacitor network.

4. The multipurpose power converter according to claim 1, wherein when the first switch is on and the second switch is off, the third leg and the inductor-capacitor network are configured as an active filter in the single-phase AC power converter.

5. The multipurpose power converter according to claim 1, wherein when the first switch is off and the second switch is on, the inductor-capacitor network is switched off in the three-phase AC power converter.

6. A multipurpose power converter system configured to provide AC power to a load of a transport climate control system, the multipurpose power converter system comprising:
a multipurpose power converter including:
a rectifier having a first leg, a second leg, and a third leg;
a first switch and a second switch; and
an inductor-capacitor network,
wherein the first switch and the second switch are connected to the third leg, the second switch being between a power source and the third leg;
the inductor-capacitor network is connected to the first switch, the first switch being between the third leg and the inductor-capacitor network;
when the first switch is on and the second switch is off, the multipurpose power converter is configured as a single-phase AC power converter; and
when the first switch is off and the second switch is on, the multipurpose power converter is configured as a three-phase AC power converter;
a DC-link capacitor; and
a controller,
wherein the DC-link capacitor is connected to the multipurpose power converter, and
the controller is configured to control the first switch and the second switch.

7. The multipurpose power converter system according to claim 6, wherein the third leg includes a connection point between a first active switch and a second active switch, and
a first end of the first switch and a first end of the second switch are connected to the connection point.

8. The multipurpose power converter system according to claim 7, wherein a second end of the first switch is connected to an inductor of the inductor-capacitor network, and
a capacitor of the inductor-capacitor network is connected to the DC-link capacitor.

9. The multipurpose power converter system according to claim 6, wherein when the first switch is on and the second switch is off, the third leg and the inductor-capacitor network are configured as an active filter in the single-phase AC power converter.

10. The multipurpose power converter system according to claim 6, wherein when the first switch is off and the second switch is on, the inductor-capacitor network is switched off in the three-phase AC power converter.

11. The multipurpose power converter system according to claim 6, wherein when a single-phase AC utility power is powering the transport climate control system, the controller is configured to switch the first switch on and to switch the second switch off.

12. The multipurpose power converter system according to claim 6, wherein when a three-phase AC utility power is powering the transport climate control system, the controller is configured to switch the first switch off and to switch the second switch on.

13. The multipurpose power converter system according to claim 6, further comprising a load,
the multipurpose power converter and the DC-link capacitor are configured to provide power to the load.

14. The multipurpose power converter system according to claim 13, wherein the load includes an inverter circuit.

15. A method for controlling a multipurpose power converter for converting power for a transport climate control system, the multipurpose power converter including a rectifier having a first leg, a second leg, and a third leg; a first switch and a second switch; and an inductor-capacitor network, the first switch and the second switch are connected to the third leg, the second switch being between a power source and the third leg; and the inductor-capacitor network is connected to the first switch, the first switch being between the third leg and the inductor-capacitor network;
the method comprising:
determining that the multipurpose power converter is connected to one of a single-phase AC power source and a three-phase AC power source;
when the multipurpose power converter is connected to a single-phase AC power source, controlling, by a controller, the first switch on and the second switch off, so that the multipurpose power converter is configured as a single-phase AC power converter; and
when the multipurpose power converter is connected to a three-phase AC power source, controlling, by the controller, the first switch off and the second switch on, so that the multipurpose power converter is configured as a three-phase AC power converter.

16. The transport climate control system according to claim 15, wherein the third leg includes a connection point between a first active switch and a second active switch, and
a first end of the first switch and a first end of the second switch are connected to the connection point.

17. The transport climate control system according to claim 15, wherein a second end of the first switch is connected to an inductor of the inductor-capacitor network, and
a capacitor of the inductor-capacitor network is connected to a DC-link capacitor.

18. The transport climate control system according to claim 15, wherein when the first switch is on and the second switch is off, the third leg and the inductor-capacitor network are configured as an active filter in the single-phase AC power converter.

19. The transport climate control system according to claim 15, wherein when the first switch is off and the second switch is on, the inductor-capacitor network is switched off in the three-phase AC power converter.

20. The transport climate control system according to claim 15, wherein the multipurpose power converter and a DC-link capacitor are configured to provide power to a load.

* * * * *